May 11, 1954   R. L. BURLA   2,677,986
SHUTTER AND ACTUATING MECHANISM FOR SLIDE PROJECTORS
Original Filed June 16, 1950   2 Sheets-Sheet 1

*INVENTOR.*
RONALD L. BURLA
BY
Wilfred E. Lawson
ATTORNEY

INVENTOR.
RONALD L. BURLA
BY
Wilfred E. Lawson
ATTORNEY

Patented May 11, 1954

2,677,986

UNITED STATES PATENT OFFICE 2,677,986

SHUTTER AND ACTUATING MECHANISM FOR SLIDE PROJECTORS

Ronald L. Burla, Beverly Hills, Calif., assignor to The Cadwell Corporation, Beverly Hills, Calif., a corporation of California Original application June 16, 1950, Serial No. 168,469. Divided and this application March 7, 1951, Serial No. 214,389

2 Claims. (Cl. 88—28)

This invention relates to slide exhibiting apparatus and more particularly to means to arrest the projection of the light through the apparatus during the periods in which an exhibited slide is being removed and a slide to be exhibited is being positioned for exhibition.

This application constitutes a division of my co-pending application Serial No. 168,469, filed June 16, 1950.

Heretofore during the presentation of an illustrated lecture, it has been customary for the lecturer to employ the services of an assistant whose duty it was periodically during the lecture to close the shutter of the stereopticon projector and while maintaining the shutter closed to manually extract from the projector the exhibited slide and to substitute therefor a slide to be exhibited and then subsequently to open the shutter. The slide changing therefor has required several manual operations to be performed in proper sequence and hence the successful operation of the exhibitor or projector required the services of a skilled operator.

The primary object of this invention is to interrupt the projection of light through the exhibitor during the changing of the slides being exhibited.

A more specific object is to decrease the heat required to be absorbed by the light interrupting means during the periods that the slides are being changed and thereby to avoid danger of warpage or buckling of the light interrupting shutter.

Another object is to avoid the necessity of employing the services of a skilled operator of the projector apparatus during the presentation of an illustrated lecture or during the exhibition of slides.

The above and other objects may be attained by employing this invention which embodies among its features, a film gate mounted to rock toward and away from an aperture through which light is projected, an injector for moving a slide from the bottom of a stack of slides and advancing it toward the film gate, and means connected to the injector and the film gate for advancing the slide onto the film gate while the latter is away from the aperture.

Other features include an ejector operating across the aperture for displacing an exhibited slide and clearing the aperture for the presentation of another slide thereto and means connected to the ejector and to the film gate, and injector operating means for operating the ejector in timed relation to the movements of the film gate and injector.

Still other features include a shutter for intercepting light projected through the aperture and means operating in timed relation to the operation of the film gate and the injector and ejector for moving the shutter into opening and closing relation to the aperture.

A further and more specific feature is the locating of the shutter between the source of illumination and the condensing system so that the temperature of the shutter remains substantially constant throughout the period of operation of the projector.

Still further features include timing means operatively connected to a prime mover for continuous operation during the operation of the projector for regulating the sequence in which the shutter and the film gate, ejector and injector move.

Figure 1:
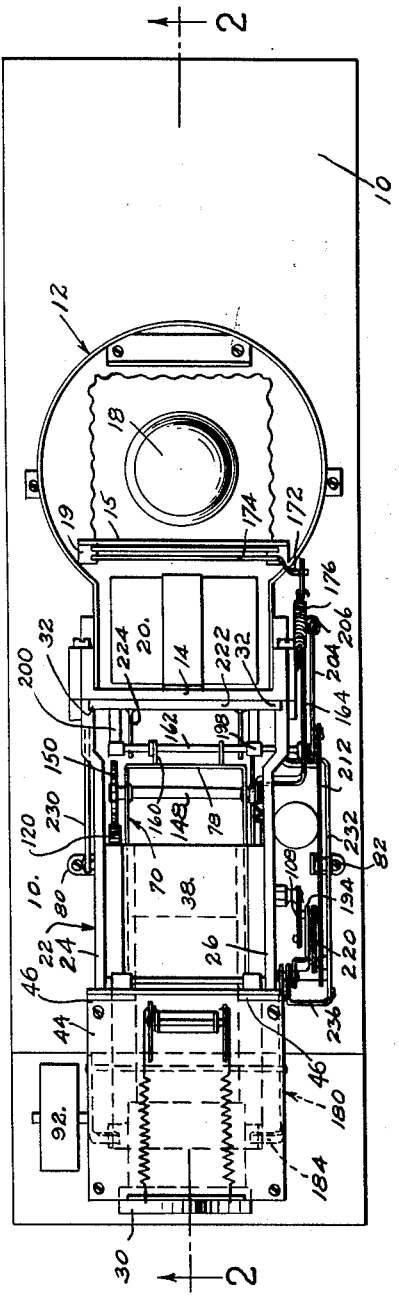
Figure 1 is a top plan view of a slide projector embodying the features of this invention, the case being omitted.
Figure 2:
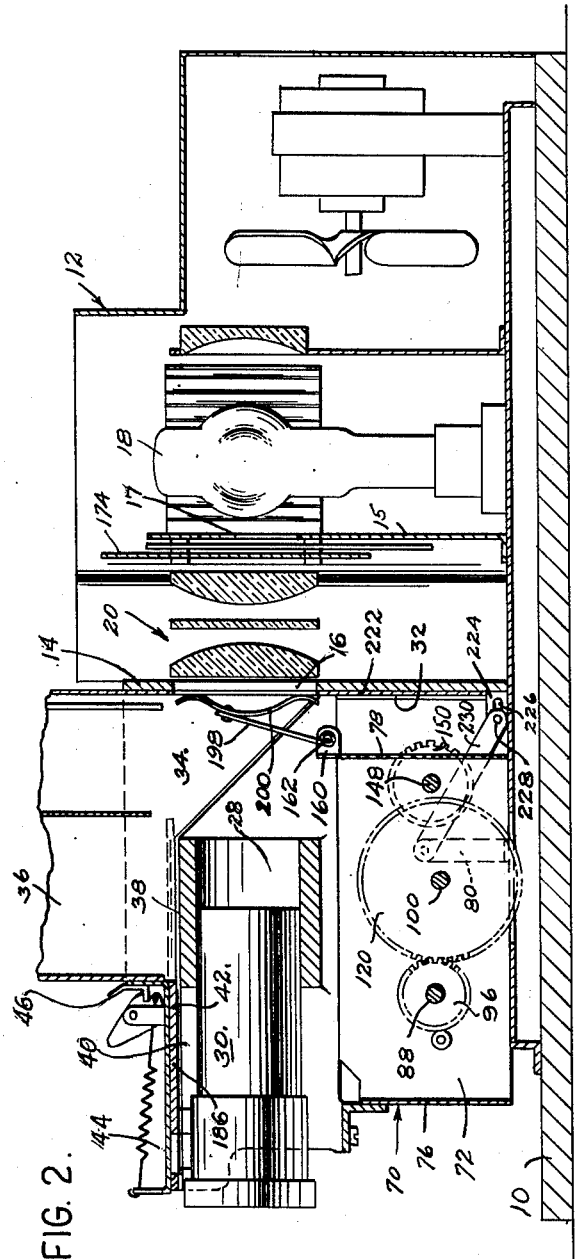
Figure 2 is a longitudinal sectional view of the projector taken substantially on the line 2—2 of Figure 1.
Figure 3:
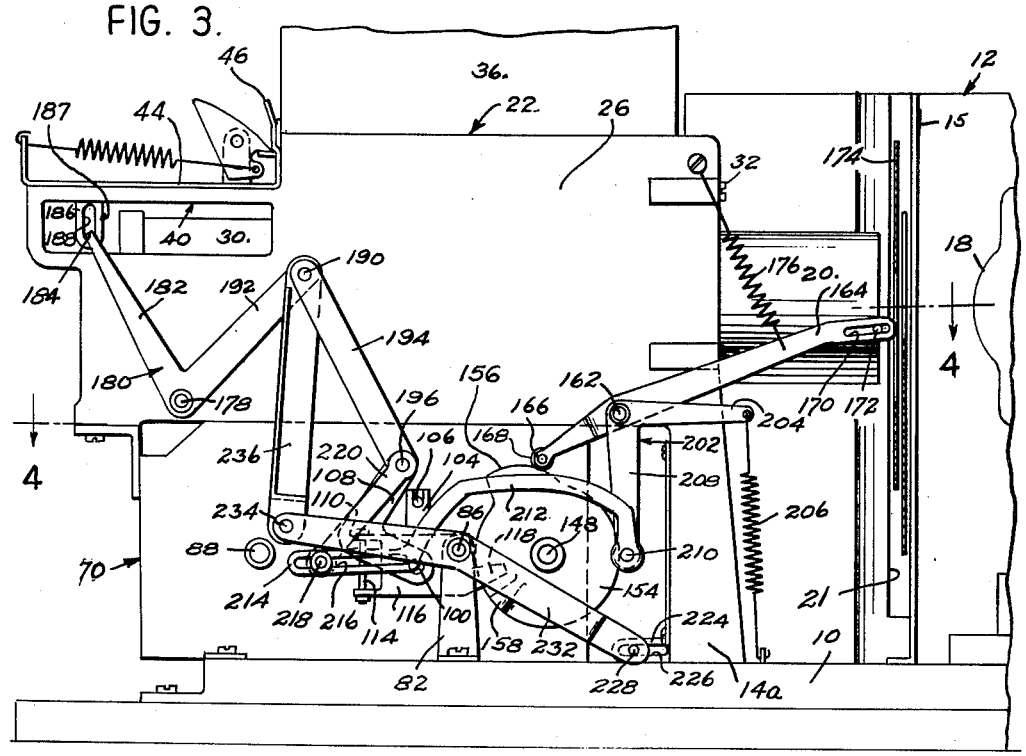
Figure 3 is an enlarged fragmentary side view of the projector illustrated in Figure 1.
Figure 4:
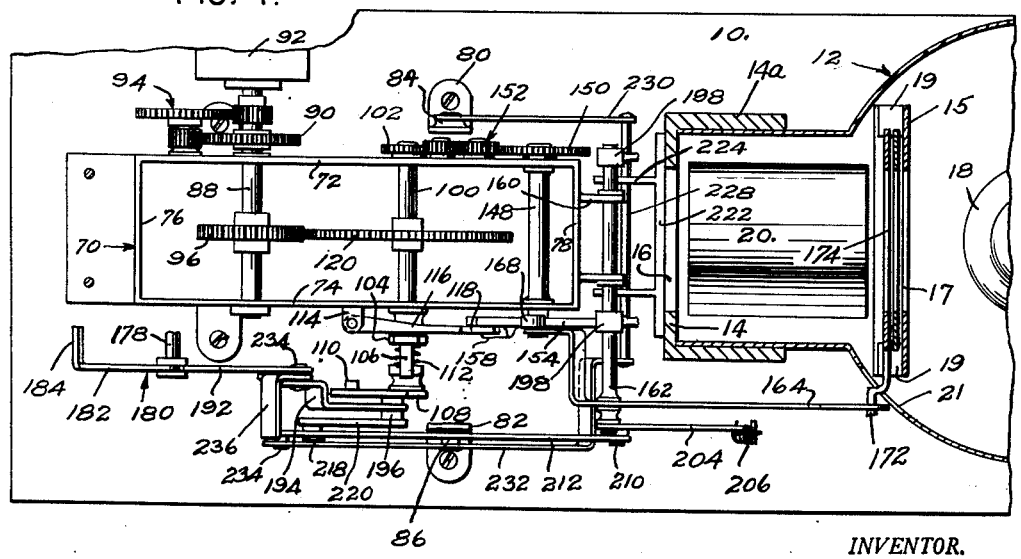
Figure 4 is a horizontal sectional view taken substantially on the line 4—4 of Figure 3.

Referring to the drawings in detail a base or bed 10 has secured thereto a lamp house designated generally 12, the front wall 14 of which is provided with an aperture 16 see Figures 2 and 4, through which light is projected from a source of illumination 18 by a system of condensing lenses 20.

Interposed within the lamp house 12 between the source of illumination 18 and the lens system 20 is a partition wall 15 having an aperture 17 therein which aligns with the lens system 20 and carried by the wall 15 on the side thereof remote from the source of illumination 18 is a pair of spaced vertical guide members 19 in which is mounted a shutter to be more fully hereinafter described. An elongated vertical slot 21 is formed in the lamp house 12, the purpose of which will hereinafter appear.

Carried by side flanges 14a of the wall 14 on the side thereof remote from the lens system 20 is a projector housing designated generally 22 comprising spaced parallel side walls 24 and 26 and carried by and extending between said side walls adjacent the ends thereof remote from the wall 14 is a housing 28 containing a focusing lens system 30 which aligns axially with the aperture 16 above mentioned. Formed at the junction of each wall 24 and 26 with the wall 14 is a vertically extending guide groove 32, the purpose of which will hereinafter appear, and formed between the wall 14 and the housing 28 is a slide receiving chamber 34.

The tops of the walls 24 and 26 are extended upwardly above the top of the focusing lens housing 28 to form guides for the lower end of a magazine 36 containing the slides to be exhibited and the top of the lens housing 28 is substantially flat to form a table 38 upon which rests the lowermost slide in the magazine 36. Carried by the walls 24 and 26 and projecting therefrom in a direction opposite the lamp house 12 is a pair of spaced parallel arms 40 and formed on the inner faces of the arms and extending into the walls 24 and 26 substantially at the level with the table 38 are opposed grooves 42 in which slides the injector, to be more fully hereinafter described. A cover plate 44 is carried by the arms 40 and overlies the injector when the latter is in the retracted position shown in Figure 2, and carried by the cover plate at the end thereof adjacent the table 38 is a pair of spaced upstanding tongues 46 forming guides for guiding the lower end of the magazine 36 into position above the table 38.

Fixed to the bed 10 below the side walls 24 and 26 is a frame designated generally 70 comprising side plates 72 and 74 held in spaced parallel relation by end plates 76 and 78, and mounted on the bed 10 in outwardly spaced relation to the side plate 72 is an upstanding pedestal 80. A similar upstanding pedestal 82 is fixed to the base 10 outwardly from the side plate 74. These pedestals carry adjacent their upper ends outwardly extending axially aligning pivot pins 84 and 86 respectively, the purpose of which will hereinafter appear.

Mounted in the frame 70 for rotation about a horizontal axis is a drive shaft 88 which projects through the plate 72 and carries adjacent its outer end a drive wheel 90 which has driving connection with a prime mover 92 as by a gear train 94. Fixed to the drive shaft 88 intermediate its ends is a pinion 96.

A driven shaft 100 is mounted in the side plates to rotate about an axis which lies parallel to the axis about which rotates the drive shaft 88. This driven shaft 100 projects beyond the side plate 72 and has fixed thereto for rotation therewith a timing gear 102. The opposite end of the driven shaft 100 projects through the plate 74 and has mounted thereon for rotation therewith and longitudinal sliding movement thereon an arm 104 carrying a laterally extending clutch pin 106. A crank arm 108 is mounted for rotation on the shaft 100 adjacent the extreme outer end thereof and carries an inwardly projecting clutch pin 110 which revolves in an arcuate path concentric about the shaft 100 and corresponds to the path in which the clutch pin 106 revolves. A compression coil spring 112 encircles the shaft 100 between the arm 104 and the crank arm 108 to normally hold the clutch pin 106 out of engagement with the clutch pin 110 and thus permit the shaft 100 to turn without imparting turning movement to the crank arm 108. Pivotally supported on the outer side of the side plate 74 as at 114 for movement about a vertical axis which lies between the shafts 88 and 100 is a trip lever 116 which engages the arm 104 adjacent the shaft 100 on the side thereof remote from the spring 112 so that when the trip lever is moved outwardly away from the plate 74 the arm 104 will be moved against the effort of the spring 112 and cause the clutch pin 106 to engage the clutch pin 110 so as to cause the crank arm 108 to rotate in unison with the shaft 100. A trip finger 118 is carried by the trip lever 116 at the end thereof remote from the pivot 114 and is engaged by the trip cam carried by the timing mechanism yet to be described.

Fixed to the shaft 100 within the frame 70 is a drive gear 120 which meshes with the drive pinion 96 which is fixed to the drive shaft 88.

Mounted in the frame 70 for rotation about an axis which lies parallel with the axes of the shafts 88 and 100 is a timing shaft 148 which projects through the plate 72 and carries adjacent its end a drive gear 150 which has driving connection with the timing gear 102 through the medium of a gear train 152. A cam wheel 154 is carried by the shaft 148 on the outside of the frame 70 adjacent the plate 74 and this cam wheel is provided on its periphery with an outstanding cam 156 the purpose of which will hereinafter appear. A trip cam 158 projects laterally from the cam wheel and moves in a rotary path which intersects the trip finger 118 so that when the cam wheel 154 rotates the trip lever 116 will be moved against the effort of the spring 112 to cause the pin 106 to engage the pin 110 and move the crank arm 108 in unison with the shaft 100.

Mounted in suitable brackets 160, carried by the wall 78, which project rearwardly therefrom on opposite sides of the side walls 24 and 26 is a transversely extending rock shaft 162 which projects beyond the outside of the wall 26 and mounted for rocking movement on the rock shaft 162 is a shutter actuating lever 164. One end of the shutter actuating lever 164 is bifurcated as at 166 and mounted for rotation in said bifurcated end 166 of the lever 164 is a roller 168 which rides on the periphery of the cam wheel 154 so that as the latter revolves, the lever 164 will be moved about the axis of the shaft 162 by the cam 156. The opposite end of the lever 164 projects toward the slot 21 in the lamp house and is slotted as at 170 to receive an arm 172 extending through the slot 21 and carried by a shutter 174 which is mounted for vertical sliding movement in the guide members 19 carried by the partition wall 15 for opening and closing the aperture 17 therein. A retractile coiled spring 176 is connected at one end to the lever 164 intermediate the rock shaft 162 and the slot 170 and the opposite end of said spring is connected to the wall 14 above the lever 164 so as to exert upward pull on the slotted end of the lever 164 and hold the roller 168 in contact with the periphery of the cam wheel 154. It will thus be seen that the cam wheel 154 revolves with the shaft 148, the shutter 174 will be reciprocated in the guide members 19 to open and close the aperture 17 in the wall 15 thus alternately interrupting the light rays emanating from the light source 18 which pass through the aperture 17.

Mounted for rocking movement on a laterally extending stud 178 carried by the wall 26 below the cover plate 44, is a V-shaped rock arm designated generally 180, one leg 182 of which extends forwardly and upwardly and carries an inwardly extending finger 184. An injector plate 186 is mounted in the guide grooves 42 in the arms 40 and this injector plate carries on the side thereof adjacent the wall 26 and adjacent the end thereof remote from the wall 14 a downwardly extending ear 187 which is provided with an elongated vertical slot 188 in which the finger 184 is received. It will thus be seen that as the rock arm 180 is moved about its pivot 178, the injector plate will be moved across the table 38. When the injector plate 186 moves to the right when viewed as in Figure 2, it will be evident that the bottommost slide in the magazine 36 will be moved rearwardly off of the table 38 and into the chamber 34. Pivotally connected as at 190 to the arm 192 of the rock arm 180 is one end of a link 194 the opposite end of which is connected as at 196 to the crank arm 108 at the end thereof remote from the shaft 100. It will thus be seen that as the crank arm 108 rotates with the shaft 100 the rock arm 180 will be rocked to cause the injector 188 to reciprocate in its guide grooves 42.

In order to catch slides delivered into the chamber 34 from the table 38 and place them in proper position for projection over the aperture 16 in the wall 14 the rock shaft 162 is provided with a film gate comprising a pair of spaced parallel arms 198 which carry spaced parallel leaf springs 200 which form cushions upon which the slides are caught in the chamber 34 and by which a slide is yieldingly held against the wall 14 in covering relation to the aperture 16 therein. A bell crank lever designated generally 202 is fixed to the rock shaft 162 adjacent the outer end thereof and one arm 204 of said bell crank lever extends substantially horizontally toward the lamp house 12 and has connected thereto one end of a retractile coiled spring 206, the opposite end of which is anchored to the base or bed 10. This spring 206 yieldingly urges the leaf springs 200 of the film gate into yielding contact with the wall 14 adjacent the aperture 16 therein. The opposite leg 208 of the bell crank lever 202 extends downwardly and pivotally connected to the lower end thereof, as at 210, is an arch shaped link 212 which extends upwardly and forwardly from the arm 208 to clear the shaft 148. The end of the link 212 opposite its pivoted connection with the arm 208 is provided with an elongate substantially horizontal extension 214 having an elongate longitudinal slot 216 therein. A stud 218 projects through the slot 216 and is fixed in a link 220 adjacent one end thereof. This link 220 is rigidly connected at 196 to the crank arm 108 so as to cause the link 212 to reciprocate through a limited distance and cause the arm 202 to rock the shaft 162 and open the film gate formed by the springs 200.

In order to eject a slide from its position before the aperture 16, in the wall 14, an ejector plate 222 is mounted to slide vertically adjacent the wall 14 in the guides 32 and carried by the ejector plate 222 adjacent the lower corners thereof are forwardly extending ears 224 each of which is provided with an elongate longitudinally extending slot 226. Extending through the slots 226, in the ears 224, is a cross bar 228 and riveted or otherwise secured to the cross bar 228 at the end thereof adjacent the side plate 72 is one end of an arm 230, the opposite end of which is pivotally mounted on the stud 84 carried by the pedestal 80. An ejector actuating lever 232 is riveted or otherwise rigidly secured to the end of the cross bar 228 remote from the arm 230 and this lever is pivotally mounted intermediate its ends on the stud 86 carried by the pedestal 82. The end of the lever 232 remote from the cross bar 228 is pivotally connected at 234 to the lower end of a link 236, the upper end of which is connected to the pivot 190 at the junction of the arm 192 and the link 194. It will thus be evident that as the pivot 190 moves downwardly under the influence of the link 194, the link 236 will likewise move downwardly to rock the lever 232 about its pivot 86 and thus cause the ejector 222 to move upwardly in its guide ways 32.

In operation a magazine containing the slides to be exhibited is placed on the exhibitor with its lower open end disposed between the upper edges of the side walls 24 and 26 above the table 38. With the magazine in such a position the bottommost slide in the magazine will rest on the table 38 and the device is ready for operation. The prime mover 92 is then energized, thus causing the drive shaft 88 to rotate the drive pinion 96. Rotation of the shaft 100 causes the timing shaft 148 to rotate through the medium of the gear train 152 and causes the cam wheel 154 to revolve. As the cam wheel 154 revolves, the roller 168 riding on the periphery thereof is engaged by the cam 156 to cause the lever 164 to rock about the shaft 162 and move the shutter 174 in its guide ways to open and close the opening 17 in the partition wall 14. It is to be noted that the cam 156 is of such a shape that the shutter 174 is gradually moved to open position and so held for a period of time sufficient to give adequate visibility to the slide being projected and that at the expiration of such period, the shutter rapidly moves to closed position. As the cam wheel 154 rotates and immediately after the shutter 174 moves to closed position, the trip cam 158 carried by the cam wheel 154 engages the finger 118 on the trip lever 116 and moves the trip lever 116 about its pivot 114 against the effort of the spring 112 so as to shift the arm 104 and the pin 106 outwardly. Such outward movement of the pin 106 causes it to engage the pin 110 on the crank arm 108 so as to cause said crank arm 108 to rotate in unison with the shaft 100. The revolution of the crank arm 108 about the axis of the shaft 100 actuates both the slide injector and the ejector mechanism as follows: As the end of the crank arm 108 moves downwardly at the start of its revolution, the pivot connection 196 exerts pull on the link 194 to move the link 236 downwardly and rock the lever 232 so as to cause the ejector 222 to move upwardly in its guides 32 and push a slide held against the wall 14 by the film gate springs 200 upwardly and clear of the apertures 16 in the wall 14. Simultaneously with the downward movement of the link 236, the rock lever 180 is moved about its pivot 178 to move the arm 182 in a clockwise direction and thus cause the injector 186 to advance in its guide grooves 42 across the table 38 and push a slide resting thereon into the chamber 34. In the meantime the link 220 will have been moved by the crank arm so that the stud 218 engages the end of the slot 216 in the extension 214 of the link 212 to exert push thereon and cause the bell crank 202 to rock against the effort of the spring 206 and move the film gate springs 200 away from the wall 14 and into a position to receive the slide projected into the chamber 34 by the injector 186. Upon further movement of the crank arm 108, the link 220 will withdraw the stud 218 from contact with the end wall of the slot 216 and permit the film gate springs to be moved under the influence of the spring 206, and thus move the slide received by the film gate springs into position before the aperture 16. Upon further movement of the cam wheel 154 the shutter 174 is moved by the cam 156 to open position so that light from the source of illumination will be projected through the slide and the picture thereon will be visible on a screen placed in front of the exhibitor. The various cycles of operation are continuously repeated so long as the prime mover 92 remains energized. In this way automatic exhibition of slides may be accomplished.

While in the foregoing there has been shown and described the preferred form of this invention, it is to be understood that minor changes in the details of construction, combination and arrangement of parts may be resorted to without departing from the spirit and scope of the invention as claimed.

I claim:

1. In a picture slide projector including as a part thereof a projector housing having a wall provided with an aperture before which a slide is held and a focusing lens system in the housing at one side of said wall and aligned with said aperture; a lamp housing upon the opposite side of said wall and having a partition wall therein spaced from the first wall and provided with a light aperture in line with the first aperture, a light source in the housing on the side of the partition wall remote from said projector housing wall, a condensing lens system between said walls and in line with and between said apertures, vertical guide means within the lamp housing on opposite sides of said light aperture and in a plane extending transversely of the lamp housing between the light source and the condensing lens system, a shutter supported by said guide means for vertical movement to cover and uncover the light aperture, a shaft disposed transversely of the housings and extending at one end beyond one side of the housings, an elongate lever pivoted intermediate its ends to said shaft end for rocking movement in a vertical plane, a rotary cam disk supported to turn in a vertical plane beneath one end of said lever and having its periphery in operative connection with said lever end to effect when rotated the rocking of the lever, means for rotating the cam disk, an operative coupling between the other end of the lever and a side of said shutter by which sliding movement is imparted to the shutter upon rocking of the lever, and spring means connected with the lever to maintain said operative connection between the cam periphery and the first mentioned end of the lever.

2. The invention as set forth in claim 1, wherein said operative coupling comprises an arm member secured to a side edge of the shutter and projecting laterally therefrom, said lamp housing having a side wall provided with a vertical slot through which the arm projects to the outside of the latter housing, and said other end of the lever having a slot longitudinally therein in which said arm is loosely engaged.

References Cited in the file of this patent

UNITED STATES PATENTS

| Number | Name | Date |
| --- | --- | --- |
| 1,247,608 | Alguire | Nov. 27, 1917 |
| 2,021,963 | Owen | Nov. 26, 1935 |
| 2,401,506 | Pechkranz | June 4, 1946 |